United States Patent [19]

Uriya et al.

[11] Patent Number: 5,459,418
[45] Date of Patent: Oct. 17, 1995

[54] FREQUENCY SYNTHESIZER

[75] Inventors: Susumu Uriya, Tokyo; Hideo Miyashita, Kanagawa, both of Japan

[73] Assignee: NEC Corporation, Tokyo, Japan

[21] Appl. No.: 196,374

[22] Filed: Feb. 15, 1994

[30] Foreign Application Priority Data

Feb. 15, 1993 [JP] Japan .................................. 5-048591

[51] Int. Cl.⁶ ...................................................... H03K 3/78
[52] U.S. Cl. .......................... 327/105; 327/132; 327/107; 327/129; 364/607
[58] Field of Search .................................. 328/14, 27, 22, 328/181, 186, 188; 307/271, 260, 261, 263; 364/607, 721, 718; 377/44, 47, 52; 327/100, 113, 131, 140, 105, 129, 133, 132, 107, 134

[56] References Cited

U.S. PATENT DOCUMENTS

| | | | |
|---|---|---|---|
| 3,735,269 | 5/1973 | Jackson | 328/14 |
| 3,882,403 | 5/1975 | Gerken | 328/14 |
| 4,792,914 | 12/1988 | Dartois et al. | 328/14 |

Primary Examiner—Timothy P. Callahan
Assistant Examiner—Dinh T. Le
Attorney, Agent, or Firm—Sughrue, Mion, Zinn, Macpeak & Seas

[57] ABSTRACT

A saw-tooth waveform signal generating circuit (3) generates a saw-tooth waveform signal d in response to a timing signal b derived from a reference clock a. A voltage comparator (4) slices the saw-tooth waveform signal with a reference voltage to shape the waveform thereof, thereby producing a synthesizer output e having a rectangular waveform. A counter (5) adds or subtracts a predetermined value every time a reference clock arrives. The count of the counter (5) is converted to an analog value by a DAC (6) and then is applied to, for example, the saw-tooth waveform signal generating circuit as a bias. As a result, the voltage for causing the saw-tooth waveform signal to start rising or falling is manipulated to allow the voltage comparator to slice the saw-tooth waveform signal at any desired timing. Hence, a synthesizer output can be produced in any desired phase.

14 Claims, 8 Drawing Sheets

FREQUENCY SYNTHESIZER

BACKGROUND OF THE INVENTION

1. Field of the Invention

The present invention relates to a frequency synthesizer and, more particularly, to a direct frequency synthesizer or Direct Digital Synthesizer (DDS) not using a Phase Locked Loop (PLL).

2. Description of the Related Art

In a conventional frequency synthesizer extensively used in various technological fields, digital values corresponding to a sinusoidal waveform of desired frequency are generated by a counter and a ROM or waveform data table. After that, a quasi-sinusoidal waveform is produced by a digital-to-analog converter. Such a frequency synthesizer is disclosed in, for example, U.S. Pat. No. 3,735,269.

The conventional frequency synthesizer described above is constructed to produce a desired frequency by generating a quasi-sinusoidal stepped waveform. Theoretically, therefore, the synthesizer suffers from phase errors which cannot be remove even if all the circuit elements thereof have ideal values.

Moreover, the quasi-sinusoidal waveform cannot be produced unless four or more regeneration points exist in one period. The frequency of the reference clock, therefore, has to be at least four times as high as the output frequency of the synthesizer. This increases current consumption and obstructs precision and miniaturization.

In addition, a higher order low pass filter (LPF) and, therefore, a coil part are required, making circuit integration difficult.

SUMMARY OF THE INVENTION

It is, therefore, an object of the present invention to provide a frequency synthesizer, or DDS, capable of reducing, theoretically, phase errors approximately to zero.

Another object of the present invention is to provide a frequency synthesizer capable of consuming a minimum amount of power, and having a simple circuit arrangement to facilitate circuit integration.

According to the present invention, the inventive frequency synthesizer comprises:

timing means for generating a timing signal on the basis of a clock consisting of a train of clock pulses;

saw-tooth waveform generating means responsive to said timing signal for generating a saw-tooth waveform signal whose time and voltage amplitude are proportional;

shaping means for shaping said saw-tooth waveform;

counting means for counting a predetermined value every time a clock pulse arrives and for outputting a count value; and converting means for converting said count value to a voltage signal so that said count value is supplied to said saw-tooth waveform generating means as a bias or is supplied to said shaping means as a reference voltage.

The operation of the frequency synthesizer having the above construction will be described.

In accordance with the present invention, a saw-tooth waveform signal is applied to a voltage comparator and has the waveform thereof shaped to produce a synthesizer output having a rectangular waveform. At this instant, a counter adds or subtracts a predetermined value every time a counter clock (reference clock or clock produced by, for example, stepping the clock down) arrives. The count of the counter is converted to an analog value. By this analog value, the voltage for causing a saw-tooth waveform signal to start rising or falling or the reference voltage for the voltage comparator, is manipulated to allow the saw-tooth waveform signal to be sliced at any desired timing. As a result, the synthesizer output is produced in any desired phase.

With the present invention, therefore, it is possible to reduce phase errors to zero. In principle, this is not achievable with a conventional DDS. Moreover, since the reference clock is operable at low speed, current consumption is reduced. The present invention does not need a table for generating a quasi-sinusoidal waveform and, therefore, eliminates the need for an LPF, accomplishing a simple arrangement. As a result, the present invention implements a frequency synthesizer for circuit integration.

BRIEF DESCRIPTION OF THE DRAWINGS

The above and other objects, features and advantages of this invention will become more apparent from the following detailed description taken with the accompanying drawings in which:

FIGS. 2(a) to 2(d) form a timing chart covering various parts of the conventional frequency synthesizer shown in FIG. 1;

FIGS. 4(a) to 4(g) form a timing chart covering various parts of the preferred embodiment of the frequency synthesizer shown in FIG. 3;

FIGS. 6(a) to 6(e) form a timing chart representative of the operation of the frequency synthesizer shown in FIG. 5;

FIGS. 11(a) to 11(e)' form a timing chart covering various parts of the timing circuit shown in FIG. 10;

In the drawings, the same reference numerals denote the same structural elements.

DESCRIPTION OF PREFERRED EMBODIMENTS

First, to facilitate an understanding of the present invention, a related art frequency synthesizer will be described with reference to FIGS. 1 and 2.

Figure 1:
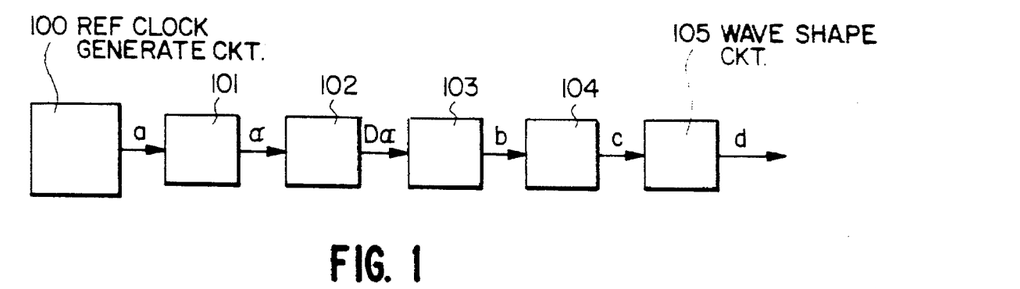
FIG. 1 is a block diagram schematically showing a conventional frequency synthesizer.
Figure 2A:
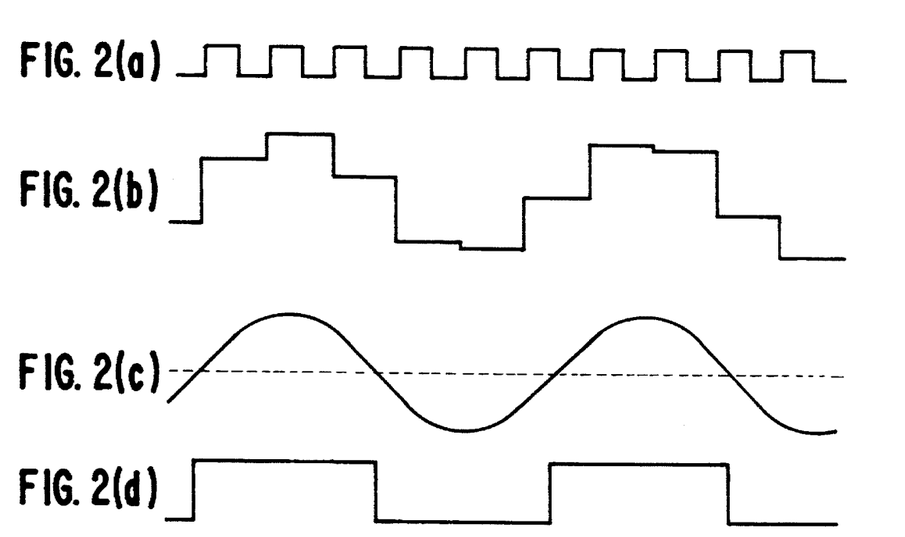

In FIG. 1, the frequency synthesizer of the related art comprises a reference clock generating circuit 100, a counter 101, a Read Only Memory (ROM) 102, a digital-to-analog converter 103, a Low Pass Filter (LPF) 104 and a waveform shaping circuit 105. The reference clock generating circuit 100 generates a reference clock a and feeds it to the counter 101 (FIG. 2(a)). The counter 101 counts the clock pulse of the reference clock and delivers a count value to the ROM 102 as a read address $\alpha$. The counter 101 is a step counter having an output range of 0-M and adding a predetermined number every time one pulse of the reference clock a arrives. Also, the counter 101 is a continuous counter which outputs, when the count value X thereof exceeds a maximum value M available therewith, the excess $\{X-(M+1)\}$ and starts on the next counting operation by using $\{X-(M+1)\}$ as an initial count. This is one of the most popular methods used to designate the addresses of a ROM without using a CPU. The ROM 102 stores a table listing waveform data matching a sinusoidal waveform. Waveform data $D\alpha$ designated by the address $\alpha$ is read out of the ROM 102 and transferred to the digital-to-analog converter 103. As a result, the digital-to-analog converter 103 outputs a voltage signal b changing stepwise, as shown in FIG. 2(b). The LPF 104 removes higher harmonics thereof from the voltage signal b. The resulting output of the LPF 104 resembles a sinusoidal waveform with respect to smoothness (FIG. 2(c)). The waveform shaping circuit 105 shapes the waveform of the output of the LPF 104 to produce a rectangular waveform signal d (FIG. 2(d)). The signal d is fed out as a synthesizer output.

The above-mentioned conventional synthesizer (DDS) has the following characteristic. When the reference clock a is continuously applied to the counter 101, the output of the counter (address $\alpha$ of ROM 102) sequentially changes within the range of 0-M. Assuming that (M+1) is equal to M, the output $\alpha$ of the counter 101 corresponding to n consecutive clock pulses is expressed by the following equation:

$$\alpha = M(nN/M - [nN/M]). \tag{1}$$

In equation (1), the symbol [] is representative of Gauss. This is also true with the other equations to follow.

Assuming that the resolution of the digital-to-analog converter 103 is E (e.g. E=256 in the case of eight bits), then the output data $D\alpha$ of the ROM 102 is produced by the following equation:

$$D\alpha = [E(\sin (\pi\alpha/M)+1)/2] \tag{2}$$

When equation (1) is substituted into equation (2), the following equation is obtained:

$$D\alpha = [E(\sin 2\pi(nN/M-[nN/M])+1/2]. \tag{3}$$

Since the digital-to-analog converter 103 simply converts a digital value to an analog value, the output $V_o$ thereof is equal to the product of $D\alpha$ and a conversion coefficient h as shown in the following equation:

$$V_o = h[E(\sin 2\pi(nN/M-[nN/M])+1)/2]. \tag{4}$$

Assuming that the reference clock a has a period T, then n is equal to $[t/T]$. By substituting this into equation (4), there can be obtained an output $V_o$ at a time t, expressed as follows;

$$V_o = h[E(\sin 2\pi(N[t/T]/M-[N[t/T]/M])+1)/2]. \tag{5}$$

Further, since the reference clock a has a frequency $f_r$ which is equal to 1/T, the output frequency $f_o$ is produced by the following equation:

$$f_o = 1/(MT/N) = f_r \cdot N/M. \tag{6}$$

The conventional frequency synthesizer described above suffers from phase errors, needs a higher reference clock, aggravates current consumption, obstructs precision and miniaturization, and makes circuit integration difficult, as stated above.

Now there will be described in detail preferred embodiments of the present invention with reference to FIGS. 3 to 16.

Figure 3:
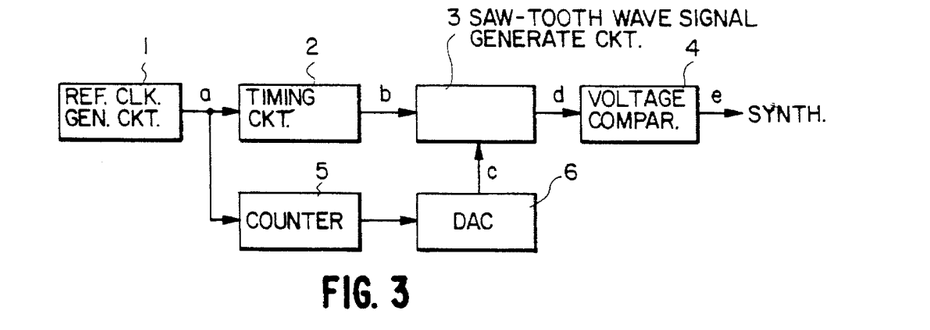
FIG. 3 is a block diagram of a preferred embodiment of the frequency synthesizer of the present invention.
Figures 4A, 4G:
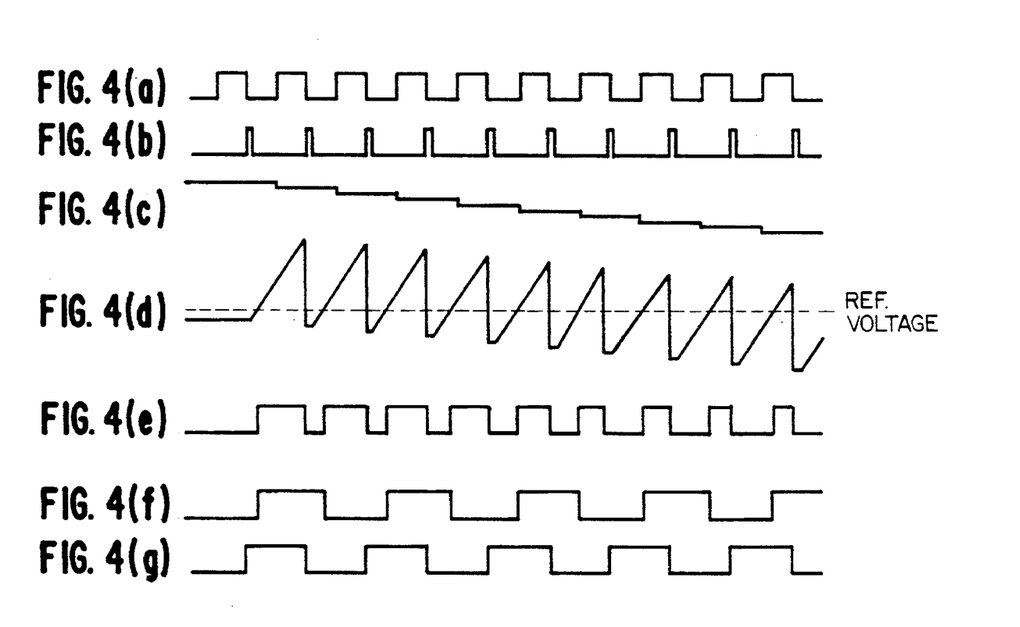

In FIG. 3, a frequency synthesizer according to a preferred embodiment of the present invention includes a reference clock generating circuit 1, a timing circuit 2, a saw-tooth waveform signal generating circuit 3, a voltage comparator 4, a counter 5, and a digital-to-analog converter (DAC) 6. The reference clock generating circuit 1 generates a reference clock a, shown in FIG. 4(a), and feeds it to the timing circuit 2 and counter 5 in parallel. As shown in FIG. 4(b), the timing circuit 2 produces a timing signal b in the form of a pulse train in synchronism with, for example, the negative-going edges of the reference clock a. The timing signal b is applied to the saw-tooth waveform signal generating circuit 3. The timing circuit 2 described above generates a single timing pulse in response to each pulse of the reference clock a. There are also available other various types of timing circuits, e.g., one which generates a timing signal whose timing pulses are locally lost (FIG. 10), and one which generates a plurality of timing pulses within one period of the reference clock a. The timing circuit of the type shown in FIG. 10 will be specifically described later.

The counter 5 is implemented as, for example, a down counter and decremented by a predetermined value N in response to the positive-going edge of each pulse of the reference clock, or counter clock a. The DAC 6 converts each count of the counter 5 to a voltage c. Therefore, so long as the counter 5 is sequentially decremented, the output voltage c of the DAC 6 decreases, as shown in FIG. 4(c). The output voltage c of the DAC 6 is applied to the saw-tooth waveform generating circuit 3. Specific constructions of the counter 5 are shown in FIGS. 12–16.

Figure 7:
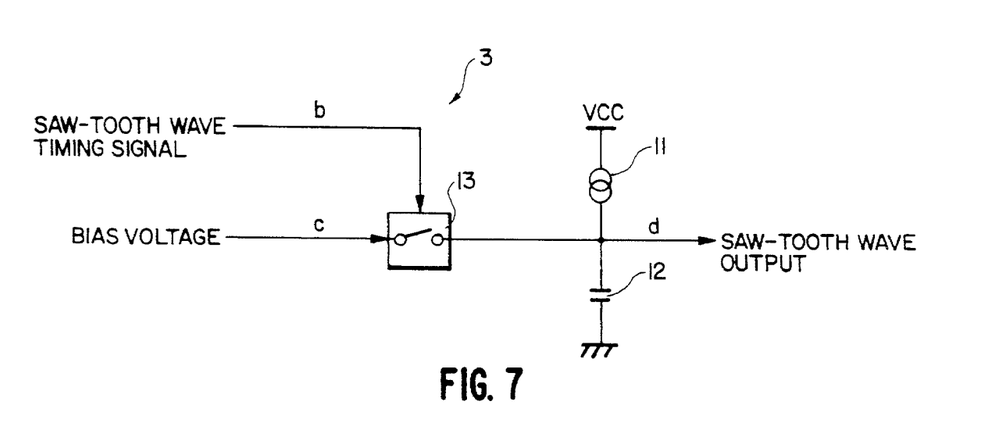
FIG. 7 is a diagram of a preferred embodiment of the saw-tooth waveform signal generating circuit used in FIG. 3 or 5.
Figure 9:
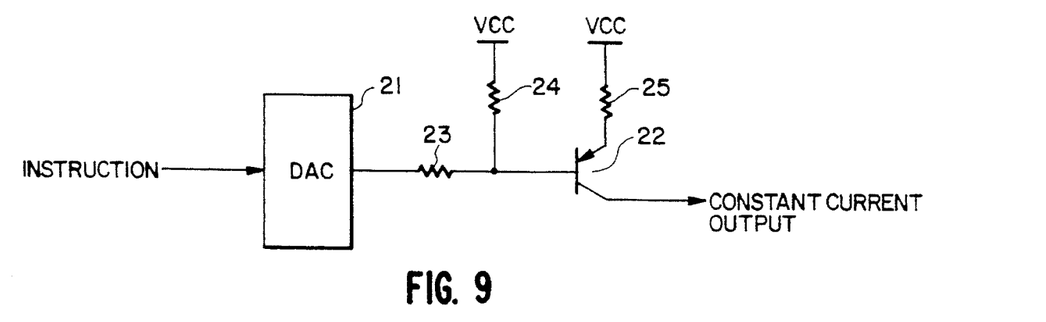
FIG. 9 is a circuit diagram similar to FIG. 7 except that a constant current source is modified to a variable type.

Using the output voltage c of the DAC 6 as a bias voltage, the saw-tooth waveform signal d repetitively goes high and goes low in response to the consecutive pulses of the timing signal b (FIG. 4(d)). FIGS. 7 and 9 each shows a specific construction of the saw-tooth waveform generating circuit 3, which will be described later. The voltage comparator 4 compares the input saw-tooth waveform signal d with a fixed reference voltage with respect to amplitude (FIG. 4(d)) and shapes the waveform of the signal d to produce a rectangular waveform signal e (FIG. 4(e)). The signal e is fed out as the output of the synthesizer.

It will be seen from above that the timing for the saw-tooth waveform signal c to reach the reference voltage of the voltage comparator 4 can be decided as desired and based on the output voltage c of the DAC 6. Specifically, it is possible to cause the rectangular waveform signal e to go high and go low in any desired phase. Therefore, since the output voltage c of the DAC 6 is the output count of the counter 5, any desired frequency can be generated if the step width N of the counter 5 is so manipulated as to cause the signal e to go high and go low in a continuous phase.

FIGS. 4(f) and 4(g) show specific waveforms for illustrating how a frequency is generated. The waveforms of FIGS. 4(f) and 4(g) are respectively produced by halving the output e of the voltage comparator 4 and the output a of the reference clock generating circuit 1 and setting up a duty ratio of 1:1. As shown, the waveform of FIG. 4(f) has a longer period than the waveform of FIG. 4(g), so that a frequency lower than the frequency of the reference clock a appears on the output signal e of the voltage comparator 4. This will also be seen when FIG. 4(f) is compared with FIG. 2(d).

More specifically, assume that the output frequency of the synthesizer is $f_o$ and that the reference clock a has a frequency $f_r$. Then, the output frequency $f_o$ is lower than the frequency $f_r$ when the counter 5 is a down counter or higher than the frequency $f_r$ when it is an up counter. The output frequency $f_o$ is obtainable based on the following equation (7), using the frequency $f_r$ of the reference clock a, the step width N of the counter 5, and the maximum value M (M=M+1) of the counter:

$$f_o = f_r \cdot (1 + N/M). \tag{7}$$

It will be seen that the ratio of $f_r$ to $f_o$ ($f_r/f_o$) is far smaller when equation 7 is used than when the previous equation 6 is used.

Figure 5:
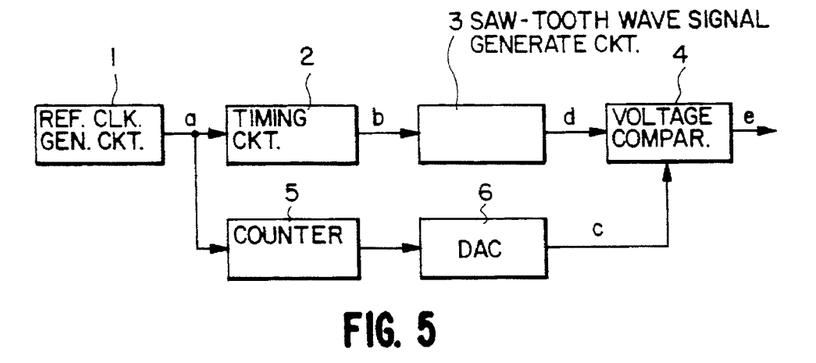
FIG. 5 is a block diagram of another preferred embodiment of the frequency synthesizer of the present invention.

FIG. 6 demonstrates the basic operation of the circuitry shown in FIG. 5. The operation and effect of another preferred embodiment, shown in FIGS. 5 and 6, are essentially the same as the above-described operation and effect, except for the following. The counter 5 is implemented as an up counter. The DAC 6, therefore, produces an increasing voltage c shown in FIG. 6(c). The voltage c is applied to the voltage comparator 4 as a reference voltage. While the bias voltage to the saw-tooth waveform generating circuit 3 is maintained constant, the reference voltage is changed. In the circuitry of FIG. 5, the output frequency $f_o$ of the frequency synthesizer is lower than the frequency $f_r$ of the reference clock a when the counter 5 is an up counter or higher than the frequency $f_r$ when the counter is a down counter.

Figures 6A, 6E:
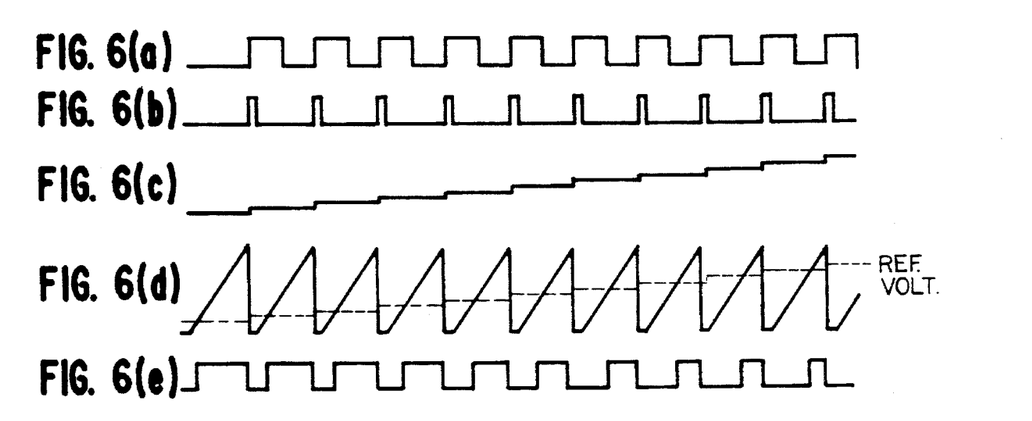

Regarding the operation of the counter 5, FIGS. 4 and 6 show respective parts of the decrementing process and the incrementing process to illustrate the basic operation. The signal d can be shaped at all times if the slice level (reference voltage level) for waveform shaping is confined in the amplitude range of the signal d by selecting the maximum value M of the counter 5 adequately and generating the signal d on the basis of the bias voltage c.

Referring to FIGS. 7–16, specific arrangements of the individual constituents of the embodiment will be described. FIG. 7 shows a specific construction of the saw-tooth waveform signal generating circuit 3 applicable to the synthesizer shown in FIG. 1. A constant current source 11 and a capacitance 12 are connected in series between a power source VCC and ground. The capacitance 12 is charged by the constant current source 11. The junction between the constant current source 11 and the capacitance 12 is connected to one terminal of a switch 13. A bias voltage c is applied to the other terminal of the switch 13. The switch 13 is caused to open and close in synchronism with the generation of the saw-tooth waveform, i.e., by the timing signal b. In this configuration, the required saw-tooth waveform signal d, whose bias is manipulated as shown in FIG. 4(d) by way of example, appears on the junction between the constant current source 11 and the capacitance 12.

Figure 8A:
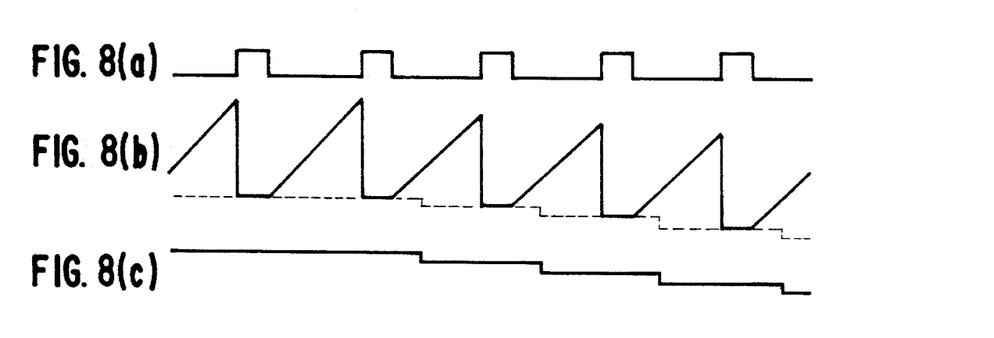
FIGS. 8(b) to 8(d) form a timing chart representative of the operation of the saw-tooth waveform signal generating circuit shown in FIG. 7.

FIG. 8 is a timing chart representative of a specific operation of this kind of circuit. Specifically, when the switch 13 is opened, the capacitance 12 is charged by a current I flowing in from the constant current source 11 and generates a voltage E. Assume that the switch 13 is opened for a period of time t, and that the capacitance 12 has a capacitance C. Then, the voltage E is expressed as E=I·t/C. Since the current I and capacitance C are constant, the voltage E is proportional to the period of time t in the resulting waveform.

Assume that a timing signal b shown in FIG. 8(b) is applied to the switch 13 as a control signal, and that the switch 13 is closed over the duration of a pulse of the signal b and is opened over the interval between successive pulses. Then, the capacitance 12 is charged such that a waveform is generated in which the time and the voltage amplitude are proportional while the switch 13 is open. On the other hand, a bias voltage c, shown in FIG. 8(c), is applied to the other terminal of the switch 13. Hence, while the switch 13 is closed, the capacitance 12 is discharged to the bias voltage. As the above operation is repeated in response to every pulse of the timing signal b, a saw-tooth waveform signal d shown in FIG. 8(d) is produced. In this manner, the reference level for the generation of a saw-tooth waveform signal can be changed by an extremely simple arrangement. It is to be noted that, when the other terminal of the switch 13 is connected to ground, the saw-tooth waveform signal generating circuit 3 applicable to the synthesizer of FIG. 5 is implemented.

The constant current source 11 may be constructed as a variable current type current source, as shown in FIG. 9 by way of example. In FIG. 9, a DAC 21 outputs a voltage which is variable in accordance with an external instruction. However, when a certain constant output voltage of the DAC 21 is applied to the base of a transistor 22, the voltage between the terminals of an emitter resistor 25 remains constant. Consequently, the current flowing to the emitter of the transistor 22 is fixed to cause the transistor 22 to output a constant current via the collector thereof. It follows that, when the external instruction is changed, the output current changes proportionally. With such a variable current type constant current source, it is possible to change the gradient of the waveform of the saw-tooth waveform signal and, therefore, the phase of the synthesizer output, as desired.

In the saw-tooth waveform signal generating circuit shown in FIG. 7, the capacitance 12 begins to be discharged at the positive-going edge of each timing pulse. This brings about a problem that the discharge start timing sometimes coincides with or adjoins the timing at which the rising portion of the saw-tooth waveform signal reaches the reference voltage (slice level) of the voltage comparator 4. If the discharge start timing is given unconditionally in such a situation, it is likely that no output will appear or an incorrect output will appear.

The above problem is particular to a synthesizer of the type using a down counter and manipulating a bias for the generation of a saw-tooth wave (FIG. 4), and to a synthesizer of the type using an up counter and manipulating a reference voltage, i.e., slice level (FIG. 6).

Figure 10:
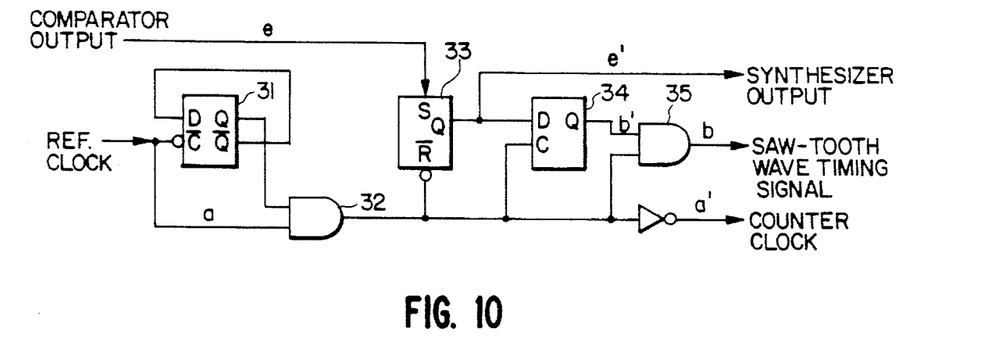
FIG. 10 is a diagram of a preferred embodiment of a timing circuit used in FIG. 3 or 5.

FIG. 10 shows a preferred configuration of the timing circuit 2, capable of eliminating the above-discussed problem. In FIG. 10, the timing circuit uses the output e of the voltage comparator 4, in addition to the reference clock a, in generating the timing for the generation of the saw-tooth wave, i.e., timing signal b. When this timing circuit is applied to the synthesizer whose operation is shown in FIG. 4, the synthesizer will operate as shown in FIG. 11.

Figure 11A:
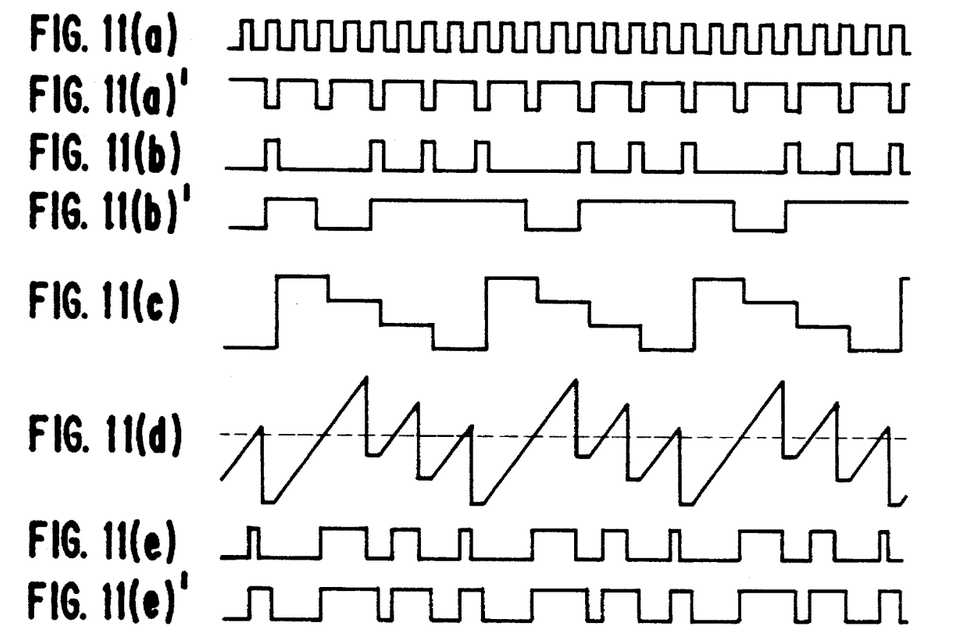

In FIG. 10, the reference clock a shown in FIG. 11(a) specifically is applied to an anti-phase clock input terminal of a flip-flop 31 and one input terminal of an AND gate 32. In the flip-flop 31, the anti-phase output terminal is connected to a signal input terminal while a positive phase output terminal is connected to the other input terminal of the AND gate 32. An output terminal of the AND gate 32 is connected to an anti-phase reset input terminal of a flip-flop 34, one input terminal of an AND gate 35, and an input terminal of an inverter 36. The flip-flop 31 and AND gate 32 cooperate to divide the frequency of the reference clock a to produce a clock whose duty cycle is 1:3 and frequency is ½. This clock is inverted by the inverter 36 and then output as the counter clock (FIG. 11(a)'). In effect, the counter 5 selectively operates in response to the reference clock a or the clock produced by, for example, stepping it down.

The output e of the voltage comparator 4, having a waveform shown in FIG. 11(e) by way of example, is fed to a set input terminal of the flip-flop 33. An output terminal of the flip-flop 33 is connected to an input terminal of the flip-flop 34. The flip-flop 33 is used to hold the output e of the voltage comparator 4 for a predetermined period of time and successful to cope with, for example, chattering of the voltage comparator 4. As a result, a synthesizer output whose waveform is slightly broadened, as shown in FIG. 11(e)', appears on the output terminal of the flip-flop 33. An output terminal of the flip-flop 34 is connected to the other input terminal of the AND gate 35. The timing for the generation of a saw-tooth wave, i.e., the timing signal b, appears on an output terminal of the AND gate 35.

In the above construction, the reference clock a is stepped down by the flip-flop 31 and AND gate 32 since the output e of the voltage comparator 4 is input into the timing circuit 2. Originally, the inverse logic of the counter clock a' (FIG. 11(a)') is the timing signal, and the saw-tooth waveform signal should, in principle, be generated at the interval between consecutive timing pulses. The discharge timing is coincident with the negative-going edge of the counter clock a'.

Taking the operation shown in FIG. 11 and using a down counter as an example, the counter decrements in four Ewaveform should have four teeth. However, the peak level of the last tooth of the saw-tooth waveform is lowered to the vicinity of the reference voltage. Hence, a first wave of the saw-tooth waveform generated during the first counting operation of the counter rises from the lowermost level toward the reference voltage. However, as FIGS. 11(a)' and 11(d) indicate, when the wave has risen to a level close to the reference voltage, the discharge timing for ending the rise and forming a peak level (negative-going edge of a') is reached. The output of the voltage comparator 4 is expected to go high when the amplitude of the saw-tooth waveform signal has exceeded the reference voltage. However, when the discharge timing is given in the vicinity of the reference voltage, as stated above, it is difficult for the output of the voltage comparator 4 to go high immediately. As a result, no output appears or an incorrect output appears, as stated previously.

In such a case, the flip-flop 34 and AND gate 35 cooperate to generate a timing signal b (FIG. 11(b)) in which the discharge start timing is omitted, thereby giving priority to voltage comparison.

Specifically, although the output of the AND gate 32 is the inverse logic of the counter clock a', the flip-flop 34 gates the output e' of the flip-flop 33 at the positive-going edge of the output pulse of the AND gate 32 and delivers an output b' shown in FIG. 11(b)' to the AND gate 35. At this instant, the output of the voltage comparator 4 remains at a low level during the formation of the first saw-tooth waveform, as will be seen from the above description. This condition continues until the signal a' goes low.

Therefore, at the negative-going edge of the signal a' occurring when the first saw-tooth wave has risen to the vicinity of the reference voltage, the AND condition of the AND gate 35 is not satisfied. As a result, the timing signal b lacking the timing of the signal a' is generated (FIG. 11(b)). Consequently, the saw-tooth waveform signal appears as shown in FIG. 11(d) in association with the partly lost timing signal b. As shown, when the discharge timing is close to the slice level, the waveform of the saw-tooth wave does not fall, but it rises continuously. The voltage comparator 4, therefore, can cause the output thereof to go high immediately. FIG. 11(e) is representative of the resulting synthesizer output.

In the synthesizer of the type using an up counter and manipulating the bias for saw-tooth waveform generation, and in the synthesizer of the type using a down counter and manipulating the reference voltage or slice level, the timing circuit is sometimes required to add an extra timing. This can be done by use of two saw-tooth waveform signals different in phase from each other, although not described specifically. The gist is that a timing signal be generated which can define the timing for generating a saw-tooth waveform signal optimal for the synthesizer used.

Figure 12:
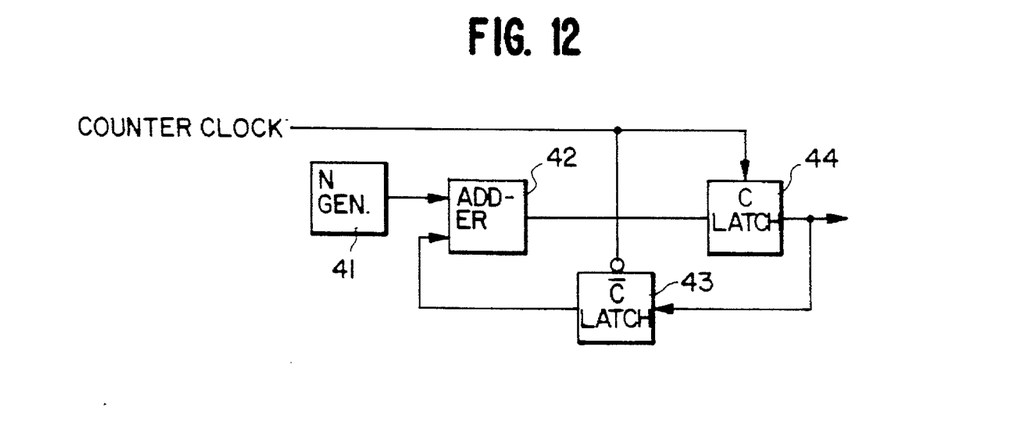
FIG. 12 is a circuit diagram of a preferred embodiment of a counter used in FIG. 3 or 5.

FIGS. 12–16 show respective preferred constructions of the counter 5. To begin with, the counter shown in FIG. 12 is a step counter for adding up a predetermined value N and having an N generator 41. An output of the N generator 41 is fed to one input of an adder 42. Applied to the other input of the adder 42 is an output of a latch 43. An output of the adder 42 is delivered to a latch 44 whose output is, in turn, fed to the latch 43 and fed to the outside as a counter output. A counter clock coming in from the outside is applied to an anti-phase clock input terminal of the latch 43 and to a clock input terminal of the latch 44. In the above construction, when the output of the latch 43 is at a low level and the output of the N generator 41 is N, the adder 42 produces an output $X_O=0+N=N$ and feeds it to the latch 44. The latch 44 latches the adder output $X_O$ in response to the positive-going edge of the counter clock, and outputs N. That is, the counter outputs N. The latch 43 latches the output N of the latch 44 in response to the negative-going edge of the same counter clock and output N. As a result, the adder 42 produces an output $X_1=N+N=2N$. Since the positive-going edge and negative-going edge of the counter clock alternate at all times, the output of the counter is incremented by N in response to every clock pulse. Consequently, the counter output is $X_{n+1}=X_n+N$.

Figure 13:
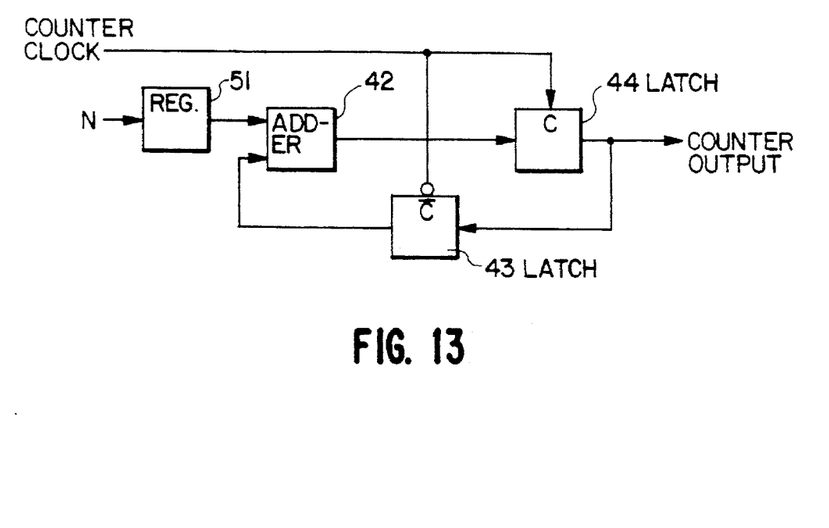
FIG. 13 is a circuit diagram of another preferred embodiment that a value N can be changed from the outside of a counter used in FIG. 3 or 5.

The value N is fixed in the counter shown in FIG. 12. Alternatively, as shown in FIG. 13, the N generator 41 may be replaced with a register 51 to allow the value N to be changed from the outside. By changing the value N, it is possible to change the frequency to be generated.

Figure 14:
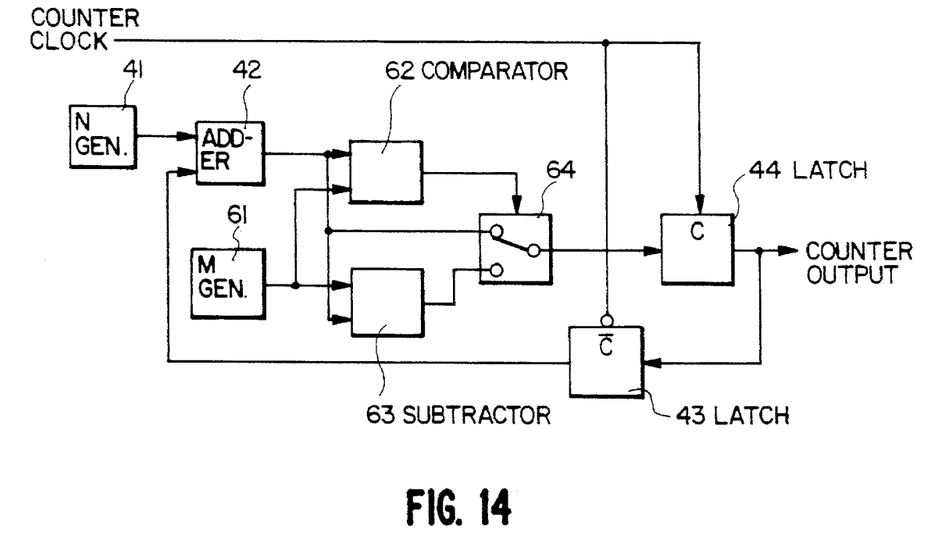
FIG. 14 is a circuit diagram of another preferred embodiment of a counter used in FIG. 3 or 5.

FIG. 14 is representative of a continuous up counter. This type of a counter adds a predetermined value N every time one clock pulse arrives and, when the count X thereof exceeds a maximum value M available therewith, outputs the excess {X−(M+1)}. Then, the counter starts on the next counting operation, using the excess {X−(M+1)} as an initial count. The counter shown in FIG. 14 differs from the counter shown in FIG. 12 in that an M generator 61, a comparator 62, a subtractor 63 and a switch 64 are connected between the adder 42 and the latch 44. Specifically, the output of the adder 42 is delivered to one input terminal of the comparator 62, one input terminal of the subtractor 63, and one switching terminal of the switch 64. An output of the M generator 61 is applied to the other input terminal of the comparator 62 and the other input terminal of the subtractor 63. An output of the subtractor 63 is fed to the other switching terminal of the switch 64. An output of the comparator 62 is applied to the switch 64 as an open/close control signal. An output of the switch 64 is applied to the latch 44. In this configuration, the comparator 62 compares the output $X_n$ of the adder 42 and the output M of the M generator 61 and, if $X_n$ is equal to or smaller than M, causes the switch 64 to select one switching terminal thereof. As a result, the output of the adder 42 is applied to the latch 44, causing the counter to operate in the same way as the counter of FIG. 12. When the adder output $X_n$ is greater than M, the comparator 62 causes the switch 64 to select the other switching terminal. As a result, the output $(X_n-M)$ of the subtractor 63 is fed to the latch 44. Therefore, the counter output is $X_{n+1}=X_n-M+N$.

Figure 15:
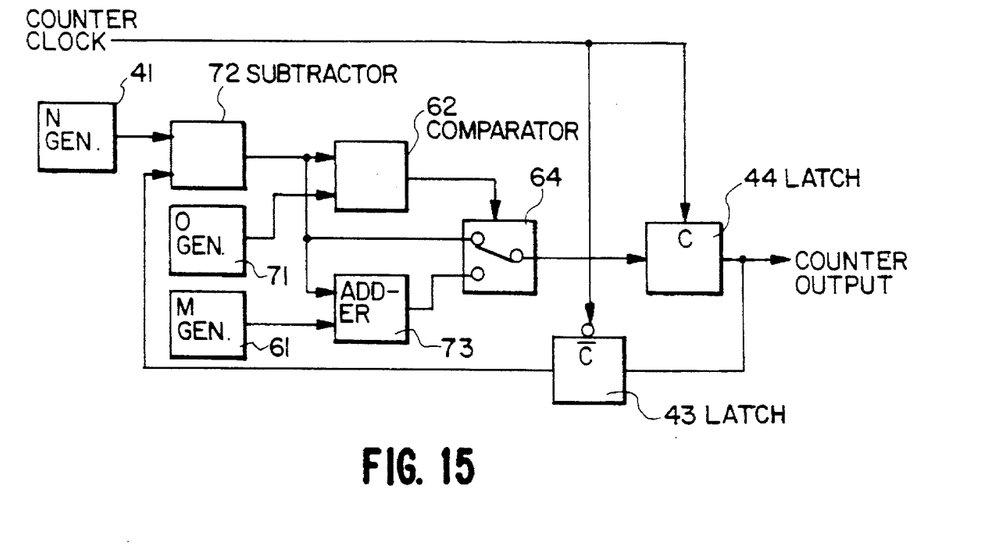
FIG. 15 is a circuit diagram of another preferred embodiment of a counter used in FIG. 3 or 5.

FIG. 15 shows a continuous down counter. This type of a counter subtracts the predetermined value N every time one clock pulse arrives and, when the count X thereof becomes smaller than a value O, adds the count X to a maximum value M available therewith, and then outputs the sum $\{(M+1)+X)\}$. At the same time, the counter starts on the next counting operation, using $\{(M+1)+X)\}$ as an initial count.

The counter of FIG. 15 is similar to the counter of FIG. 14 except that a O generator 71 is provided, that a subtractor 72 is substituted for the adder 42, and that an adder 73 is substituted for the subtractor 63. Specifically, the output of the subtractor 72 is applied to one input terminal of the comparator 62, one input terminal of the adder 73, and one switching terminal of the switch 64. The output of the O generator 71 is applied to the other input terminal of the comparator 62. The output of the M generator 61 is applied to the other input terminal of the adder 73. The output of the adder 73 is fed to the other switching terminal of the switch 64. The output of the comparator 62 is delivered to the switch 64 as an open/close control signal. The output of the switch 64 is latched by the latch 44. In operation, the comparator 62 compares the output $X_n$ of the subtractor 72 and the output of the O generator 71 and, if $X_n$ is smaller than 0, causes the switch 64 to select the output $(X_n+M)$ of the adder 73. If $X_n$ is equal to or greater than 0, the comparator 62 causes the switch 64 to select the output $X_n$ of the subtractor 72. The rest of the operation is essentially the same as the operation of the counter of FIG. 14.

Figure 16:
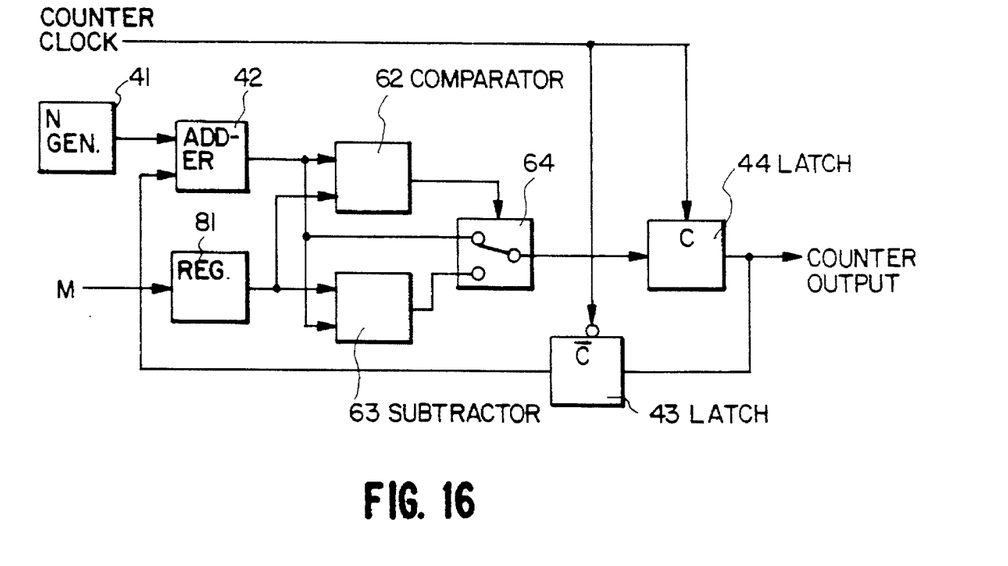
FIG. 16 is a circuit diagram similar to FIG. 14 except that a value M can be changed from the outside.

FIG. 16 shows a counter in which the M generator 61 shown in FIG. 14 is replaced with a register 81 so as to allow the value M to be changed from the outside. Similarly, even in the circuitry of FIG. 15, the M generator 61 may be replaced with a register 81 so as to allow the value M to be changed from the outside. By changing the value M, it is possible to maintain the slice level and the amplitude range of the saw-tooth waveform signal in a desirable relation.

Of course, the counters of FIGS. 14 and 15 may each be modified such that the value N is variable.

As stated above, a frequency synthesizer of the present invention applies a saw-tooth waveform signal to a voltage comparator and shapes the waveform thereof to produce a synthesizer output having a rectangular waveform. At this instant, a counter adds or subtracts a predetermined value every time a counter clock (reference clock or clock produced by, for example, stepping it down) arrives. The count value of the counter is converted to an analog value. By this analog value, the voltage for causing a saw-tooth waveform signal to start rising or falling or the reference voltage for the voltage comparator is manipulated to allow the saw-tooth waveform signal to be sliced at any desired timing. As a result, the synthesizer output is produced in any desired phase. With the present invention, therefore, it is possible to reduce phase errors to zero. In principle, this is not achievable with a conventional DDS. Moreover, since the reference clock is operable at low speed, current consumption is reduced. The present invention does not need a table for generating a quasi-sinusoidal wave and, therefore, eliminates the need for an LPF, accomplishing a simple arrangement. As a result, the present invention implements a frequency synthesizer feasible for circuit integration.

What is claimed is:

1. A frequency synthesizer comprising:
   timing means for generating a timing signal in response to a clock signal consisting of a train of clock pulses;
   saw-tooth waveform generating means, responsive to said timing signal, for generating a saw-tooth waveform signal;
   shaping means for shaping said saw-tooth waveform signal and for outputting a shaped saw-tooth waveform signal to provide an output of the frequency synthesizer;
   counting means, connected to said clock signal, for counting a predetermined value every time a clock pulse arrives and for outputting a count value; and
   converting means for converting said count value to a voltage signal to supply said count value to said saw-tooth waveform generating means as a bias voltage.

2. The frequency synthesizer as claimed by claim 1, further comprising clock generating means for generating said clock signal.

3. The frequency synthesizer as defined by claim 1, wherein said timing signal output by said timing means corresponds to one of said clock signal, and a stepped down clock signal produced by stepping down said clock signal before supplying said timing signal to said saw-tooth waveform generating means.

4. The frequency synthesizer as defined in claim 3, wherein said counting means selectively receives one of said clock signal and an inverted clock signal produced by stepping down said clock signal.

5. The frequency synthesizer as defined by claim 1, wherein said shaping means comprises voltage comparator.

6. The frequency synthesizer as defined by claim 1, wherein said converting means comprises a digital to analog converter.

7. The frequency synthesizer as claimed in claim 1, wherein said saw-tooth waveform signal generating means comprises:
   a current source having a first terminal connected to a power source;
   a capacitance having a first terminal connected in series with another terminal of said current source, and having a second terminal connected to ground; and
   a switching means to which said bias voltage is supplied via one terminal thereof, which has another terminal connected to a junction between said current source and said capacitance, and which is caused to open and close in synchronism with said timing signal.

8. The frequency synthesizer as claimed in claim 7, wherein the current source generates one of a constant current and a variable current.

9. The frequency synthesizer as claimed by claim 1, wherein said timing signal generating means comprises:
   dividing means for dividing said clock signal and for generating a divided clock signal;

inverting means for inverting said divided clock signal and for supplying said counting means with an inverted signal;

latching means for latching an output of said shaping means for a predetermined period of time; and means for generating said timing signal on the basis of an output of said latching means and said divided clock signal.

10. The frequency synthesizer as claimed in claim 1, wherein said counting means comprises one of an up counter and a down counter.

11. The frequency synthesizer as claimed in claim 1, wherein said counting means comprises:

an adder having one input to which a signal having a predetermined step width is supplied;

a first latch, which receives at a first input thereof an output of said adder, and which receives said clock signal at a clock input thereof, and which outputs said count value; and a second latch which receives said count value, and which receives said clock signal at an anti-phase clock input thereof, and which supplies another input of said adder with an output signal thereof.

12. The frequency synthesizer claimed in claim 1, wherein said counting means comprises:

a subtractor which receives said first predetermined value at one input thereof;

first supplying means which outputs a second predetermined value;

a comparator for comparing an output of said subtractor with said second predetermined value and for outputting a control signal;

means for adding said output of said subtractor and a third predetermined value generated by a second supplying means;

switching means, based on said control signal, for selecting and outputting one of said output of said subtractor and an output of said adding means;

a first latch which receives the output of said switching means, and to which said clock signal is supplied at a clock input thereof, and which outputs said count value; and a second latch, which receives said count value, and to which said clock signal is applied to an anti-phase clock input thereof, and which supplies another input of said subtractor with an output signal thereof.

13. The frequency synthesizer claimed in claim 1, wherein said counting means comprises:

an adder which receives a first predetermined value at one input thereof;

supplying means for outputting a second predetermined value;

comparing means for comparing an output of said adder with an output of said supplying means and for outputting a control signal;

means for subtracting said output of said adder and said second predetermined value;

switching means, responsive to said control signal, for selecting and outputting one of said output of said adder and an output of said subtracting means;

a first latch which receives the output of said switching means, and which receives said clock signal at a clock input thereof, and which outputs said count value; and a second latch which receives said count value, and which receives said clock signal at an anti-phase clock input thereof, and which supplies an output to the other input of said adder.

14. A frequency synthesizer comprising:

clock generating means for generating a clock signal consisting of a train of clock pulses;

timing means for generating a timing signal on the basis of said clock signal supplied to said timing means;

counting means, receiving said clock signal, for counting a predetermined value every time a clock pulse arrives and for outputting a count value;

converting means for converting said count value to a voltage signal and for supplying a saw-tooth waveform generating means with said voltage signal as a bias;

said saw-tooth waveform generating means being responsive to said timing signal for generating a saw-tooth waveform signal; and voltage comparing means for comparing said saw-tooth waveform signal with a reference voltage with respect to amplitude and for shaping said saw-tooth waveform to provide an output of the frequency synthesizer.

* * * * *

UNITED STATES PATENT AND TRADEMARK OFFICE
CERTIFICATE OF CORRECTION

PATENT NO.   : 5,459,418
DATED        : October 17, 1995
INVENTOR(S)  : Susumu URIYA and Hideo MIYASHITA It is certified that error(s) appears in the above-identified patent and that said Letters Patent is hereby corrected as shown below:

Col. 3, line 16, after "clock" insert --a--.

Col. 7, line 41, after "four" insert --consecutive steps (FIG. 11(c)), and therefore the saw-tooth--.

Col. 7, line 42, delete "E".

Signed and Sealed this

Twenty-first Day of May, 1996

*Attest:*

BRUCE LEHMAN

*Attesting Officer*   *Commissioner of Patents and Trademarks*